(12) United States Patent
Wynn et al.

(10) Patent No.: US 6,976,133 B1
(45) Date of Patent: Dec. 13, 2005

(54) SYSTEM AND METHOD FOR UPDATING DEVICES USING LIMITED AMOUNTS OF RANDOM ACCESS MEMORY

(75) Inventors: Simon Wynn, Redwood City, CA (US); Johan Eriksson, Örebro (SE); Arthur A van Hoff, Mountain View, CA (US)

(73) Assignee: BMC Software, Inc., Houston, TX (US)

( * ) Notice: Subject to any disclaimer, the term of this patent is extended or adjusted under 35 U.S.C. 154(b) by 305 days.

(21) Appl. No.: 10/318,908

(22) Filed: Dec. 13, 2002

(51) Int. Cl.[7] .............................................. G06F 13/14
(52) U.S. Cl. ........................ 711/147; 711/115; 711/155; 709/215; 709/216
(58) Field of Search ........................ 711/100, 103, 115, 711/147, 155; 709/212–217

(56) References Cited

U.S. PATENT DOCUMENTS

| 5,581,764 | A | * | 12/1996 | Fitzgerald et al. | ........... | 709/223 |
| 5,884,035 | A | * | 3/1999 | Butman et al. | ............. | 709/218 |
| 5,919,247 | A | * | 7/1999 | Van Hoff et al. | ........... | 709/217 |
| 6,272,536 | B1 | * | 8/2001 | van Hoff et al. | ............ | 709/217 |

* cited by examiner

Primary Examiner—T Nguyen
(74) Attorney, Agent, or Firm—Wong, Cabello, Lutsch, Rutherford & Brucculeri, LLP

(57) ABSTRACT

A system and method updates a device by storing into nondisk nonvolatile storage such as flash memory, the files used to update the device, using data structures that are swapped, a portion at a time, into available RAM of the device.

7 Claims, 5 Drawing Sheets

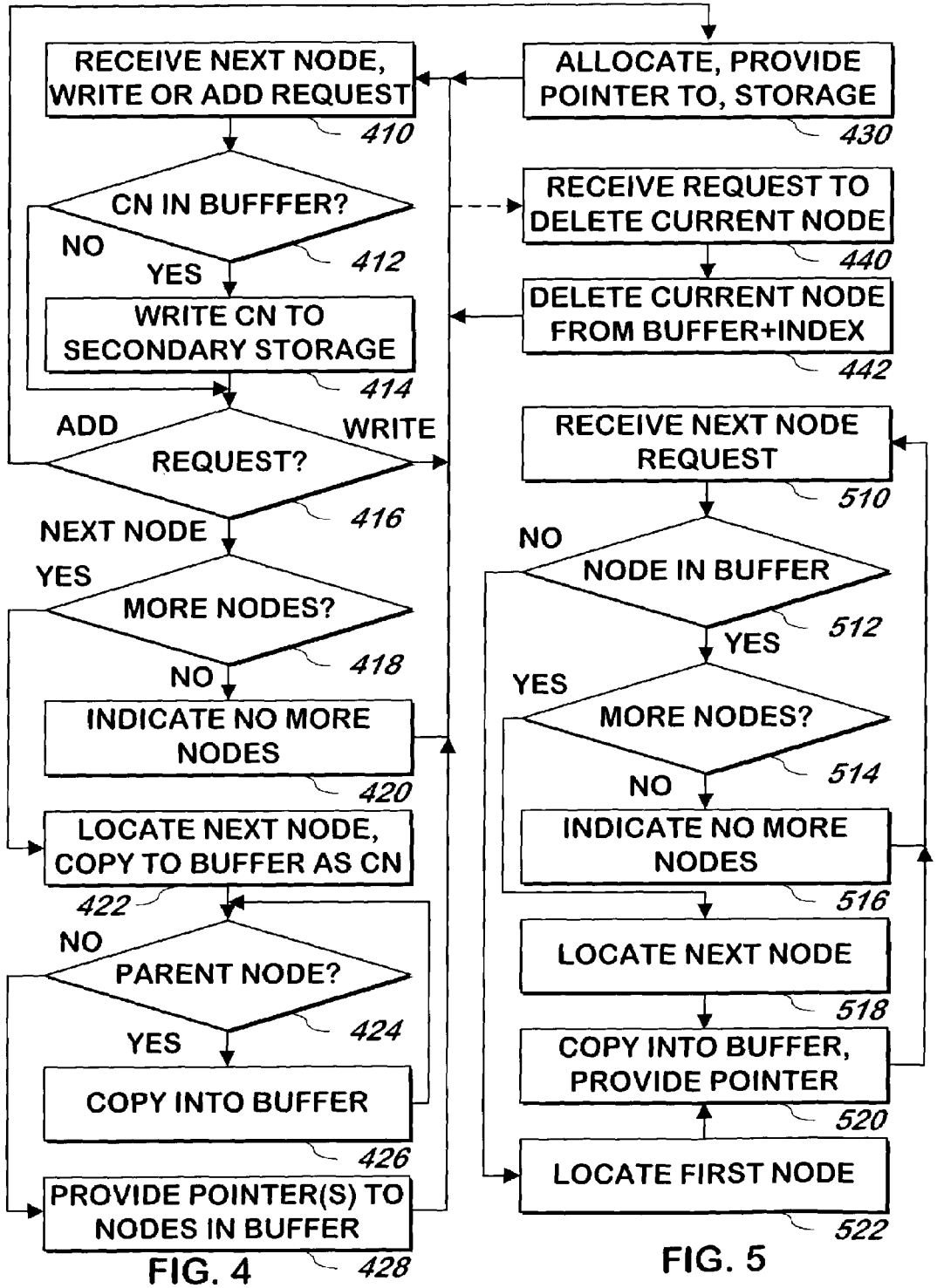

SYSTEM AND METHOD FOR UPDATING DEVICES USING LIMITED AMOUNTS OF RANDOM ACCESS MEMORY

RELATED APPLICATIONS

This application is related to U.S. Pat. No. 5,919,247 entitled "Method for the Distribution of Code and Data Updates" issued to Arthur Van Hoff et al on Jul. 6, 1999 and is incorporated herein by reference in its entirety.

FIELD OF THE INVENTION

The present invention is related to computer software and more specifically to computer software for updating information on a portable device.

BACKGROUND OF THE INVENTION

It can be desirable to update software and other sets of information on a computer system. There have been proposed different methods of updating software and other sets of information on a computer system, such as U.S. Pat. No. 5,919,247 and its progeny, and U.S. Pat. No. 5,581,764 and its progeny. Conventional updating techniques involve identifying to a server the existing files on the computer system being updated, receiving files to use to update the computer system, updating the computer system using the files received, and verifying that the update has been correctly installed.

Conventional computer systems contain large amounts of random access memory ("RAM") and large amounts of disk storage. The systems described above update files on disk using large amounts of RAM to hold the data structures used to identify the file structure, and optionally the registry structure, of the system before the update, and the proposed or actual file and/or registry structure of the computer system after the system is updated.

However, these systems are not designed to update devices with limited facilities. For example, some devices execute their operating systems or application programs directly from a nonvolatile storage, such as a ROM, flash memory or other similar device, without loading it into RAM. Although such operating systems or application programs may use RAM for data structures, they do not require the program object code to be first loaded into RAM prior to execution. Because of this capability, such devices have a limited amount of RAM, and the data structures used by conventional updating arrangements would either exceed the available RAM or use more than would be desirable, occupying too much of it to allow the operating system and any of the various application programs to operate without noticeable degradation. Such devices may include conventional mobile telephones, personal digital assistants, cameras, and the like.

What is needed is a system and method that can update computer systems that execute directly from nonvolatile storage an operating system, one or more applications, or both, and that can update files using an amount of RAM that is smaller than the data structures stored in RAM by conventional updating systems.

SUMMARY OF INVENTION

A system and method builds and uses certain large data structures used to update the computer system using nonvolatile storage, keeping in RAM only a portion of such data structures, such as the portion being used at the time, and optionally an additional portion used for cache purposes. The system and method updates files on non-disk nonvolatile storage using a smaller amount of RAM than if all of each of such data structures had been loaded into RAM all at once, allowing its operation on devices that execute directly from nonvolatile storage an operating system, one or more application programs, or both, without significant interference with their operation.

BRIEF DESCRIPTION OF THE DRAWINGS

FIG. 4 is a flowchart illustrating a method of accessing a node of an index via read and write access according to one embodiment of the present invention.

FIG. 5 is a flowchart illustrating a method of accessing a node of an index via read access according to one embodiment of the present invention.

DETAILED DESCRIPTION OF A PREFERRED EMBODIMENT

Figure 1:
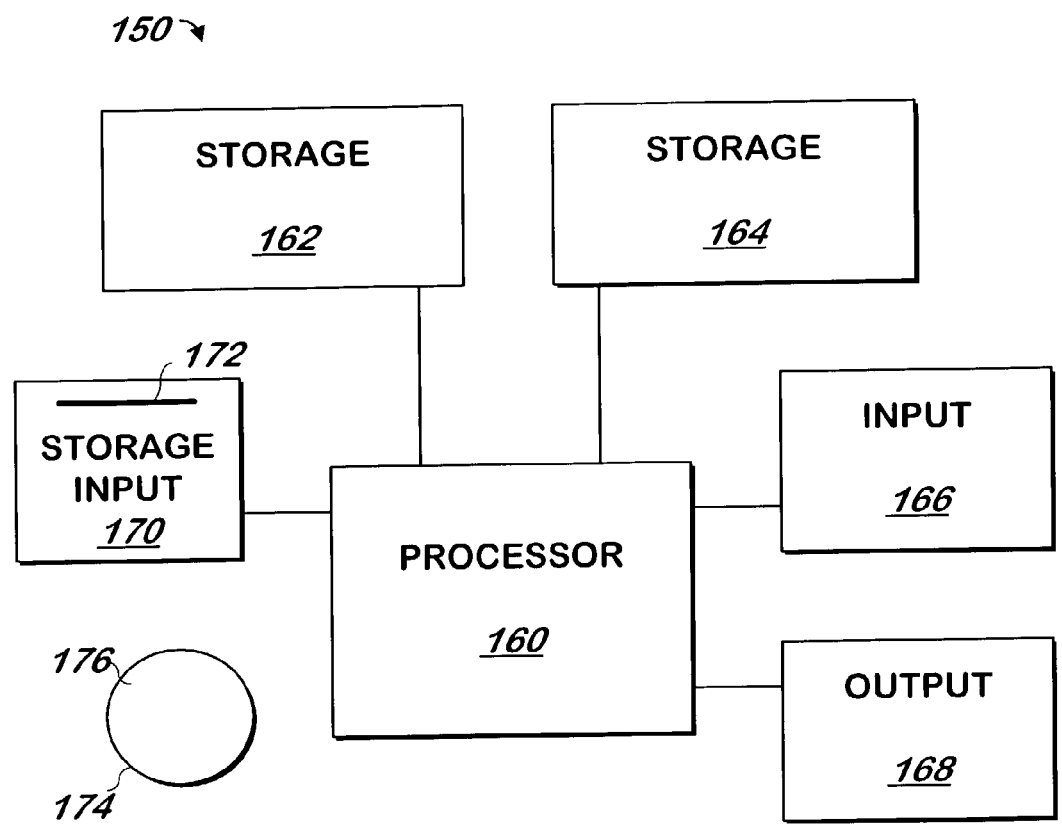
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage such as flash memory, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media such as flash memory that may be used to transport computer instructions or data to the system 150. Computer program product 174 has encoded thereon computer readable program code devices 176, such as magnetic charges in the case of a floppy disk, electrostatic charges in the case of a flash memory device or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, or a conventional personal digital assistant running the PALM operating system commercially available from Palm, Inc. of Milpitas, Calif. or POCKETPC operating system commercially available from Microsoft Corporation, including, without limitation, the TREO commercially available from Handspring, Inc. of Mountain View, Calif., the Palm Vx, commercially available from Palm, Inc., the Axim X5 commercially available from Dell Computer Corporation, the iPAQ Pocket PC series commercially available from Hewlett-Packard of Palo Alto, Calif., or a cell phone, camera, or other similar device, although other systems may be used.

Figures 2A, 2B:
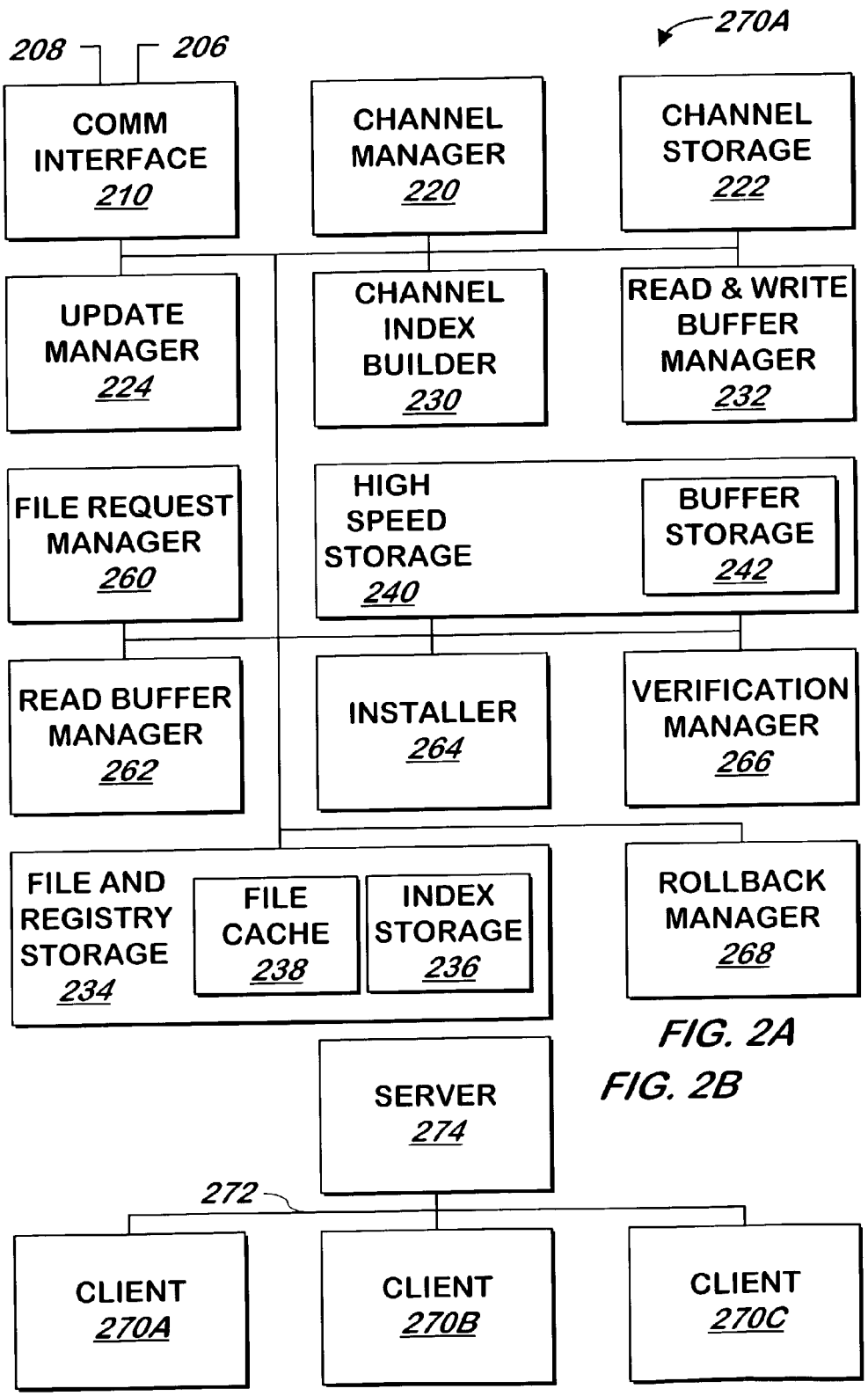
FIG. 2A is a block schematic diagram of a system for updating a device according to one embodiment of the present invention.
FIG. 2B is a block schematic diagram of a system of three of the devices of FIG. 2A and a server coupled via a network.

FIG. 2A illustrates a system for updating a device 270A according to one embodiment of the present invention. FIG. 2B illustrates that device 270A and two other similar or identical devices 270B, 270C that may also be updated in a manner similar to that used in device 270A. Referring now to FIGS. 2A and 2B, in one embodiment, devices 270A–C may be any combination of devices that are portable, battery or solar operated devices such as a cellphone, personal digital assistant digital camera or other portable devices.

In one embodiment, each device 270A–C is characterized by a capability referred to herein as "in place" execution of an operating system, one or more application programs, or both. "In place" execution means that execution of some, most or all of the program instructions are loaded for execution directly from a nonvolatile storage device, such as a nondisk device such as flash memory or ROM, without intervening storage of either multiple instructions, or even a single instruction, in the random access memory of the device. Such a device is said to execute computer program code "in place". Such devices may have smaller amounts of RAM because of their in place execution capability, and therefore, it can be desirable to limit the use of RAM when updating the device. It should be noted that "in place" execution of an operating system, application program or both does not apply to the firmware in a boot ROM or other device that is used to boot up a computer system upon the startup of that system.

In one embodiment, each device 270A–C may be characterized by an amount of available RAM or other high-speed memory that is insufficient to hold the entire set of data structures described herein, as well as other program instructions and data that are used to operate the device 270A–C during the updating of the device, although this characteristic is not present in other embodiments of the present invention. The limited amount of RAM is different from the cache that may be a part of, or integrated with, the processor in that it is not under hardware or firmware control via caching circuitry or a caching program. The limited amount of RAM is the unused amount of all of the RAM in the device in one embodiment of the present invention.

In one embodiment, each device 270A–C may also or alternatively be characterized by the storage of application program files in nonvolatile storage that does not involve disk storage. In other embodiments, each device does not have these characteristics.

Communication Interface

In one embodiment, each device 270A–C is updated by communicating with a server 274 over any conventional network 272. Server 274 may in fact be made of any number of devices that include a server, proxy server, mirrors, and/or repeaters that, together, perform the function of server 274 described herein.

In one embodiment, all communication between the device to be updated 270A–C and the server 274 is made via input/output 208 of communication interface 210 which is coupled to a network such as the Internet or a local area network or both. Communication interface 210 contains a conventional communication interface that supports TCP/IP or other conventional communication protocols. In one embodiment, communication interface 210 also contains conventional interfaces for keyboard or keypad, monitors or displays and mouse or buttons or other input devices coupled to communication interface 210 via input/output 206, through which all user input and output is received and provided.

Subscribing to Channels

In one embodiment, a user may subscribe to any one or more of various "channels" which correspond to a set of information that is logically related. A channel may be the one or more files of an application program, device firmware, including that which may be located in ROM or flash memory that contains the entire software image of the device, one or more data files, a combination of program files and/or firmware and data files or any other set of information that is logically related. A channel may correspond to a portion of the files on a device 270A–C or may correspond to all of the files on the device 270A–C. The description below includes multiple channels, although the system and method operate similarly in the event that only one channel is in use, except that the user need not designate the channel in one such embodiment.

A user or system administrator provides to channel manager 220 identifiers of one or more channels to which the device is allowed subscribe for updates, and channel manager 220 stores the identifier of the channel in channel storage 222. In one embodiment, the identifier includes a URL that can be resolved to an IP address and port of server 274 via DNS, or it may include an IP address or any similar network identifier. In one embodiment, any of the channel identifier, IP address and port of the channel may be pre-stored in channel storage 222 or automatically retrieved (via periodic communications with server 274) or received by channel manager 220 and a list of all channels is displayed on a device display (not shown) by channel manager 220 with a prompt to the user to select the one or more channels to which the device should be subscribed for updates as described herein. The user or system administrator makes such selection, and channel manager 220 stores in channel storage 222 an indication of the selection or selections made.

Initiation of the Update

Update manager 224 periodically checks channel storage 222 and initiates the update process for any of the channels to which the device 270A has subscribed for which an update is due, as indicated by channel storage 222. Update manager 224 may use schedule information stored with the channel identifier to initiate the update. For example, update information from a prior update may arrive with a date and time at which the next update should be performed and this information is stored in channel storage 222. Periodically, update manager 224 scans the channels to locate those for which updates are due by comparing such date and time with the current date and time retrieved from the system clock (not shown). If a channel is newly subscribed, update manager 224 may initiate the update process for that channel when it detects its selection in channel storage 222, for example as it scans channel storage 222 and identifies a selected channel for which no date and time the update is due is stored. In the case of a new channel, the time for the update to be performed may be treated as if it was specified as the current time or a random amount of time in the future (subject to an upper limit) by update manager 224.

Update manager 224 may also initiate an update upon request from a user or system administrator. For example, a user may instruct update manager 224 to initiate a specific one or any updates due via communication interface 210 and input/output 206 and update manager 224 either initiates the update for the specified channel or scans update storage for a description of all of the channels to which the user is subscribed and initiates any updates due as described above. A system administrator may similarly initiate the update process for a specific channel or for any update due via instructions contained in a short message service text message received by communication interface 210 via a wireless network coupled to input/output 208, and update manager 224 either initiates the update for the specified channel or scans update storage for a description of all of the channels to which the user is subscribed and initiates any updates due as described above.

Build the Channel Index

To initiate an update, update manager 224 signals channel index builder 230 with an identifier of the entry in channel storage 222 corresponding to the channel to be updated. When signaled, channel index builder 230 builds a channel index. In one embodiment, a channel index summarizes the contents and arrangement of the files, subdirectories and registry keys and values of the device.

In one embodiment, the entry in channel storage 222 contains, in addition to the channel identifier, a set of instructions including the portion of the directory structure and/or registry to which the channel index for the channel should correspond, as well as instructions regarding handling conflicts between files (e.g. if the update includes a file of the same name as an existing file, but the file for the update has a date preceding that of the existing file, don't install that file for the update).

The files and registries are stored in file and registry storage 234, which may be conventional storage that is slower than high speed storage 240. In one embodiment, high speed storage 240 includes conventional random access memory (RAM) and file and registry storage 234 includes conventional flash memory, or disk storage such as a hard disk drive, or any type of conventional storage that is slower than high speed storage 240 that does not include a disk drive.

In one embodiment an index, such as the channel index and the other indices described herein, has the structure illustrated in Appendix A. The structure of the nodes of an index matches some or all of the structure of the file system (e.g. drives, subdirectories and files), of the device for which the index is constructed, although other nodes may match the keys and values of a registry system of such device. Each index has a hierarchical arrangement, which can match a hierarchical arrangement of a file and/or registry system. In one embodiment, however, if the file system of the device for which the index is prepared had a non-hierarchical file system, all files are indexed as being children of a virtual root directory that is assigned a name to allow the file system to be indexed.

Channel index builder 230 builds the channel index in a portion of file and registry storage 234 referred to herein as index storage 236. In one embodiment index storage 236 includes one or more files in file and registry storage 234, with one file per index built as described herein.

Accessing the Index Via Buffer Management

To access index storage 236, channel index builder 230 uses read and write buffer manager 232. Read and write buffer manager 232 maintains a portion of the channel index in a buffer in buffer storage 242, which is an area of high speed storage 240. The portion stored in the buffer is less than all of the channel index stored in index storage 236. Read and write buffer manager 232 receives commands and copies one or more nodes into the buffer according to the command, as described below with reference to FIG. 4. Read and write buffer manager 232 returns a pointer to the "current" node that was the subject of the command as described herein.

In one embodiment, read and write buffer manager 232 copies from index storage 236 to buffer storage 242 some or all of each of the parent nodes of a current node. For example, if channel index builder 230 instructs read and write buffer manager 232 to allocate a new node that is the child node of a node of the index, read and write buffer manager 232 allocates storage for the new node, provides a pointer to the new node to channel index builder 230 and ensures that at least a portion of each of the parent nodes up to or including any root node are copied from index storage 236 to buffer storage 242. The parents of the new node may be linked to the current node in the buffer using a linked list.

Read and write buffer manager 232 stores the new node as a descendant of its parent in index storage 236 when channel index builder 230 so requests or otherwise when read and write buffer manager 232 makes a different node the current node.

Read and write buffer manager 232 also allows traversal of the channel index in buffer storage 242 as requested by channel index builder 230. For example, if channel index builder 230 requests a "next" node from any current node in buffer storage 242, read and write buffer manager 232 locates such a node in index storage 236, places it into buffer storage 242 and provides to channel index builder a pointer to the new current node in buffer storage 242.

The buffer in buffer storage 242 has a limited amount of space. As read and write buffer manager 232 adds new nodes to the buffer, it overwrites some or all of the other oldest nodes residing in buffer storage 242.

In one embodiment, channel index builder 230 may also instruct read and write buffer manager 232 to write the current node from the buffer to index storage 236 or may instruct read and write buffer manager 232 to delete nodes in buffer storage 242, and read and write buffer manager 232 also deletes the corresponding node in index storage 236.

In one embodiment, read and write buffer manager 232 need not maintain in the buffer so precisely the number nodes described above, but may maintain in buffer storage 242 additional nodes not required in order to cache them. For example, read and write buffer manager 232 may retrieve nodes from index storage 236 in blocks of 5, and release from buffer storage 242 as space is needed, by removing from buffer storage 242 the least recently used block of five. To fill out a block of 5 nodes, read and write buffer manager 232 may retrieve from index storage 236 the next node from the one retrieved and as many ancestor nodes of that node.

When channel index builder 230 has built the channel index for the channel, channel index builder 230 indicates to read and write buffer manager 232 to save to index storage 236 the current node in buffer storage 242 and signals update manager 224.

Send Update Request and Receive Reply

Update manager 224 sends an update request containing the channel index stored in index storage 236 to server 274 via communication manager 210 coupled to network 272 via input/output 208. Update manager 224 sends the channel index in index storage 236 that is part of the update request by requesting it a node at a time from read buffer manager 262, and then sending each node as each node is made available by read buffer manager 262. Update manager 224 uses the channel identifier in the entry in channel storage 222 corresponding to the identifier it received to address the update request to the server.

To request a node from read buffer manager 262, update manager 224 supplies a handle to, or filename of, the channel index in a request. Each time it receives such a request, read buffer manager 262 supplies as described in more detail below a different node from the channel index, which update manager 224 sends as part of the update request. The index header may be treated as the first node by read buffer manager 262 and supplied before the true nodes of the channel index, or update manager 224 may read the header directly, and send it as part of the channel update request.

Server 274 receives the update request, and builds an update reply by comparing the channel index it receives to a master index for the channel. The master index describes what a channel index on a device 270A–C would look like if it were built after the update is installed as described herein, and the master index may have the same format as a channel index. Server 274 builds the reply by building a list of actions (which can be similar or identical to editing instructions) that, if performed to the file and/or registry structure, will cause the file and registry structure to match that described by the master index for the channel, and including the list in the reply. For example, if the actions required to cause the portion or all of the file and/or registry structure corresponding to the channel to match that described by the master index are the deletion of a file, the creation of a new subdirectory and the addition of a new file to that subdirectory, server 274 so indicates in the list of actions in the update reply.

Server 274 stores the response it provided, indexed by the checksum in the header of the channel index and the checksum in the header of the master index, for use as described below. The checksum in the header of the channel index may be a hash of the channel index, which may be created by multiplying each checksum of each node of the channel index by a different factor and adding the results of each such multiplication together. Server 274 stores the set of the response and the checksums from the header of the channel index and master index in a cache, deleting the oldest nodes as it requires space to store a new set.

Optimized Updates

In one embodiment, an optimized update request may be attempted before the update request is sent. An optimized update does not contain the channel index, but instead contains the checksum created from the channel index that server 274 can use to locate updates it has recently provided. After each of the other devices 270A–C prepares a channel index as described above, and before sending an update request of its own, it sends to the same address as described above for the update request, an optimized update request containing the checksum from the channel index header in place of the channel index as described above.

Server 274 uses the checksum in the optimized update request and the channel to identify the checksum of the master index, and then uses the checksum of the optimized update request and the checksum of the master index to determine if it corresponds to a set of a responses and checksums stored in the cache as described above. If so, server 274 sends the response associated with the checksums it had previously stored in the cache as described above.

If server 274 determines that it does not have a response in its cache corresponding to the optimized update request, it so indicates to device. Update manager 224 receives the indication and sends the update request containing the channel index and receives a reply as described above.

Build a Copy of the Master Index

Update manager 224 receives the update reply via communication interface 210 and stores it into file and registry storage 234. If the update reply contains a date and time after which a subsequent update should be attempted, update manager 224 stores such date and time in channel storage 222 with the channel identifier corresponding to the reply. In one embodiment, update manager 224 stores the update reply as it is received, in order to conserve high speed storage 240 used by communication interface 210 to provide the reply to update manager 224. Update manager 224 then uses the update reply and the channel index to build a copy of the master index.

Update manager 224 uses read buffer manager 262 to read the channel index by repeatedly requesting the "next" node. Read buffer manager 262 provides the next node as described above, but in all cases, provides such nodes in sorted order in response to each request from update manager 224. In one embodiment, the order used by read buffer manager 262 (and by read and write buffer manager 232 described above) is alphabetical order of the names of each node, with ties broken in order of the lowest offset of the parent node, and remaining ties are broken in order of the type of the node, with directory nodes preceding file nodes, although any other predictable orderings may be used.

To provide a node, read buffer manager 262 adds it to buffer storage 262 (unless it is already in buffer storage 262 as described below) and provides a pointer to the node. Read buffer manager 262 uses buffer storage 242 to retrieve only the next node in sorted order from the channel index in index storage 236 in one embodiment, or in another embodiment, retrieves the next node and an additional set of the next four nodes into buffer storage 242 if the next node is not already in buffer storage 242 and provides a pointer to the next node in buffer storage 242. Buffer storage 242 contains a limited amount of storage: as read buffer manager 262 adds a node or nodes to buffer storage 242 other oldest nodes residing in buffer storage may be overwritten or deleted. As update manager 224 reads a node from the channel index, it uses the update reply to determine whether the node should be deleted in the copy of the master index it builds in index storage 236, whether a new node should be added in the copy of the master index, if the node should be changed, either by the replacement of a file with another file or by modifying the file according to a separate file of modification instructions, or if the node is the same in the copy of the master index as the channel index.

If the node is unchanged, update manager 224 copies the node from the channel index to a copy of the master index it builds using read and write buffer manager 232, which operates as described above. If the node is indicated in the update reply as being removed, update manager 224 does not copy it into the master index. If a node is indicated as being added, update manager adds it, linked to the node from which the new node is indicated as descending in the update reply. If the node is indicated as being changed, update manager 224 makes the change to the node in the copy of the master index it builds, optionally by using the conflict and other instructions that may be stored in the entry for the channel in channel storage 222.

When update manager 224 has completed building the copy of the master index, update manager 224 indicates to read and write buffer manager 232 to write out the current node in buffer storage 242 to the copy of the master index in index storage 236 and provides to file request manager 260 handles to the files containing the channel index and the copy of the master index, as well as the identifier of the entry in channel storage 222 corresponding to the channel being updated.

Requesting the Files

File request manager 260 compares the channel index with the copy of the master index in index storage 236 to determine the differences between the two. File request manager 260 receives each node of each of the channel index and the copy of the master index in sorted order from read buffer manager 262 via buffer storage 242 and for each node corresponding to a file that is in the copy of the master index that is not in, or different from the corresponding node in, the channel index, file request manager 260 checks file cache 238 to identify whether the file is in file cache 238. If the file is in file cache 238, file request manager 260 continues processing nodes as described above. If the file is not in the file cache 238, file request manager adds any or all of the name, size, date and hash of the file into a list of files to be requested. In one embodiment, file request manager 260 appends this information in the list to a file in file and registry storage 234 to conserve the amount of high speed storage 240 that it uses for the list of files. Because the nodes are received in order, and a predictable order is used, update manager 224 can determine whether a node has been added or removed or changed from the two nodes it receives and knowledge of how the ordering is performed.

In one embodiment, the response received from server 274 may indicate that a portion of a file can be replaced with a specified file at a specified location, and file request manager 260 then adds to the list the specified file that contains the portion.

When file request manager 260 has completed building the list of files, file request manager 260 builds a file request containing the list of files and the channel identifier and sends the request to communication interface 210, which forwards the file request to the server 274 via the channel address or a different address, used to request files, that is stored in the entry for the channel retrieved from channel storage 222 by file request manager 260.

Server 274 receives the file request and provides the files to the device 270A from which the file request was received. Communication interface 210 receives the files and provides them to file request manager 260, which stores the files in file cache 238 in file and registry storage 234. In one embodiment, if the file cache is full, file request manager 260 deletes the files least recently stored in the file cache 238 to make room for newly received files. In one embodiment, server 274 adds a manifest with the files, the manifest containing a list of the filenames of the files in the reply, a hash (e.g. MD5) of each file and a size of each file to allow the device 270A–C to verify that the file has been received uncorrupted and file request manager 260 performs such verification as it stores the files. In another embodiment, file request manager 260 uses the copy of the master index to perform such verification.

Files identified as corrupted or not fully received may be rerequested by file request manager 260, which receives any such rerequested files or portions of files, verifies them and stores them in the file cache 238 in file and registry storage 234 with the other files received as described above. If a rerequested portion of an incompletely received file is received, file request manager 260 may physically or logically append it to the portion of such file that had been received in the file cache 238 in file and registry storage 234. When all of the files either in the list of files requested or on the manifest have been properly received, file request manager 260 signals installer 264 by providing it the handle of the copy of the master index, the handle of the channel index and, optionally, the location of the file cache 238 and the identifier of the entry in channel storage 222 corresponding to the channel being updated.

Installing the Update

Installer 264 receives the handles of the copy of the master index and the channel index and, optionally, the location of file cache 238, provides the handles to read buffer manager 262 using different requests to obtain, one at a time, the nodes in the copy of the master index and the channel index. For each node of each index, if the nodes match, installer 264 requests the next nodes for each of the copy of the master index and the channel index. If the node corresponds to a subdirectory, if the subdirectory is in the copy of the master index but does not exist in the channel index, installer 264 creates the subdirectory in file and registry storage 234. If a subdirectory exists in the channel index for which no node exists in the copy of the master index, installer 264 deletes the subdirectory from file and registry storage 234. Installer 264 performs these same functions for files and the values of registry keys, however, in one embodiment, instead of deleting files, they are moved into an area of deleted files in file and registry storage 234 (which may be the file cache 238 or a cache similar to it) so that they may be restored, if desired, as described below. If a node in the copy of the master index corresponds to a file that has different characteristics from those in the master index, installer 264 copies the file from the location in which files received from server 274 were stored as described above. In one embodiment, before the copy is performed, the file is moved, e.g. via renaming it, to the area of deleted files in file and registry storage 234.

As described above, one or more portions of a file may be replaced with all or portions of a file received. In such embodiment, the node in the copy of the master index specifies which portion of the file and the name or other identifier of the file containing the portion. Alternatively, the file received may contain editing instructions for the file, to indicate that characters 5–42 should be deleted, characters 43–44 should be replaced with 5 other characters specified in the file received, and that 17 characters specified in the file received should be appended between characters 95 and 96 of the file. In either such embodiment, installer 264 saves the original file or the portion being replaced to the area of deleted files in file and registry storage 234 and then performs the indicated replacement of the portion or the editing instructions specified.

When installer 264 has completed reading, via read buffer manager 262, all of the nodes in the copy of the master index and all of the nodes in the channel index and processed them as described above, installer 264 signals verification manager 266 by providing the handle to the copy of the master index.

Verifying the Update

Verification manager 266 receives the handle to the master index and instructs read buffer manager 262 to step through the nodes in the copy of the master index by repeatedly requesting the next node. For each node provided by read buffer manager 262, verification manager 266 verifies that the file, directory or registry key exists in the proper position in the file system or registry system hierarchy and that it has the name, size and/or hash specified in the copy of the master index, and optionally, that the editing instructions or portion of the file being replaced has or have been properly carried out. When verification manager 266 has completed verifying each node in the hierarchy without discovering any errors, verification manager 266 signals update manager 224 and the update is complete.

If verification manager 266 discovers that file and registry storage 234 does not correspond to the copy of the master index, in one embodiment, it signals update manager 224 that the update was not successful. In another embodiment, if verification manager 266 discovers that file and registry storage 234 does not correspond to the copy of the master index, verification manager 266 updates the corresponding node in the copy of the master index to correspond to state of the corresponding directory or file in file and registry storage 234. In such embodiment, verification manager 266 may use read and write buffer manager 232 in place of read buffer manager 262 to modify the copy of the master index. In another embodiment, verification manager 266 doesn't modify the copy of he master index, but instead, builds a new index as it verifies the copy of the master index, the new index being built in the same manner as the channel index described above, to correspond to the actual state of the device 270A after the installation is complete.

If any modifications were made to the copy of the master index by verification manager 266 or if the new index is different from the master index, verification manager so indicates to update manager 224 (and provides to update manager 224 a handle to the new index if a new one is built). Update manager 224 stores the file names of the channel index and either the copy of the master index or the new index in channel storage 222 associated with the entry corresponding to the channel updated, may then use the new index in place of the channel index to repeat the update process described herein to perform a second attempt to update the device 270A.

Rollback

In one embodiment, if the user cannot operate the updated sets of information properly, the user may signal update manager 224 to undo the installation. To perform this function, update manager 224 provides via a user interface a list of the channels to rollback, and allows the user to select a channel to have its most recent installation undone. When the user so indicates, update manager 224 provides to rollback manager 268 handles to the channel index and either the new index, if one was produced as described above, or the updated copy of the master index, retrieved from channel storage 222. In one embodiment, if verification manager 266 indicates to update manager 224 that the installation did not occur properly as described above, update manager 224 can provide to rollback manager 268 handles to the channel index and either the new index, if one was produced as described above, or the updated copy of the master index. It is assumed for purpose of description below that a new index was produced, however, the updated copy of the master index may be used in its place in embodiments in which the new index was not produced.

Rollback manager 268 then compares the new index with the channel index using read buffer manager 262 for each index in the same manner described above that file request manager 260 compared the channel index with the copy of the master index, however, in this case, the comparison is reversed with respect to the channel index, to determine the actions that need to be taken to change file and registry storage 234 to match the channel index, from its current position of matching the new index.

As nodes are compared and actions are determined for each node, rollback manager 268 performs those actions, copying files that had been deleted or overwritten during the operation of installer 264 for the channel from the area where they were stored by installer 264 as described above back to their original locations. The files, registry keys and values, and directories added for the channel by installer 264 during the installation of the update described above are deleted, directories or registry keys and values deleted by installer 264 during the installation of the update for the channel are added, and registry key values modified are restored, all by rollback manager 268 as it scans, via read buffer manager 262, the two indices to identify differences. If a file was modified with a new portion of the file, the file is restored to its original state by rollback manager 268 either coping the original file from the area in which deleted files were stored or by copying the portion to replace the new portion added as described above.

The use of read buffer manager 262 and read and write buffer manager 232 (and the corresponding methods described herein) allows the various uses of indices described above to occur even if the total space for the indices used and optionally, other data structures in concurrent use, exceeds the available RAM of the device 270A on which the update is being performed. The fact that non-disk storage may be used allows updates to the devices described above. As described above, storage onto a device such as a nonvolatile memory such as a solid state memory such as flash memory allows the update of devices that don't contain a disk. Such updates are referred to herein as updating onto a "sinedisk" device, or being performed "sinedisklessly".

Method

Figure 3:
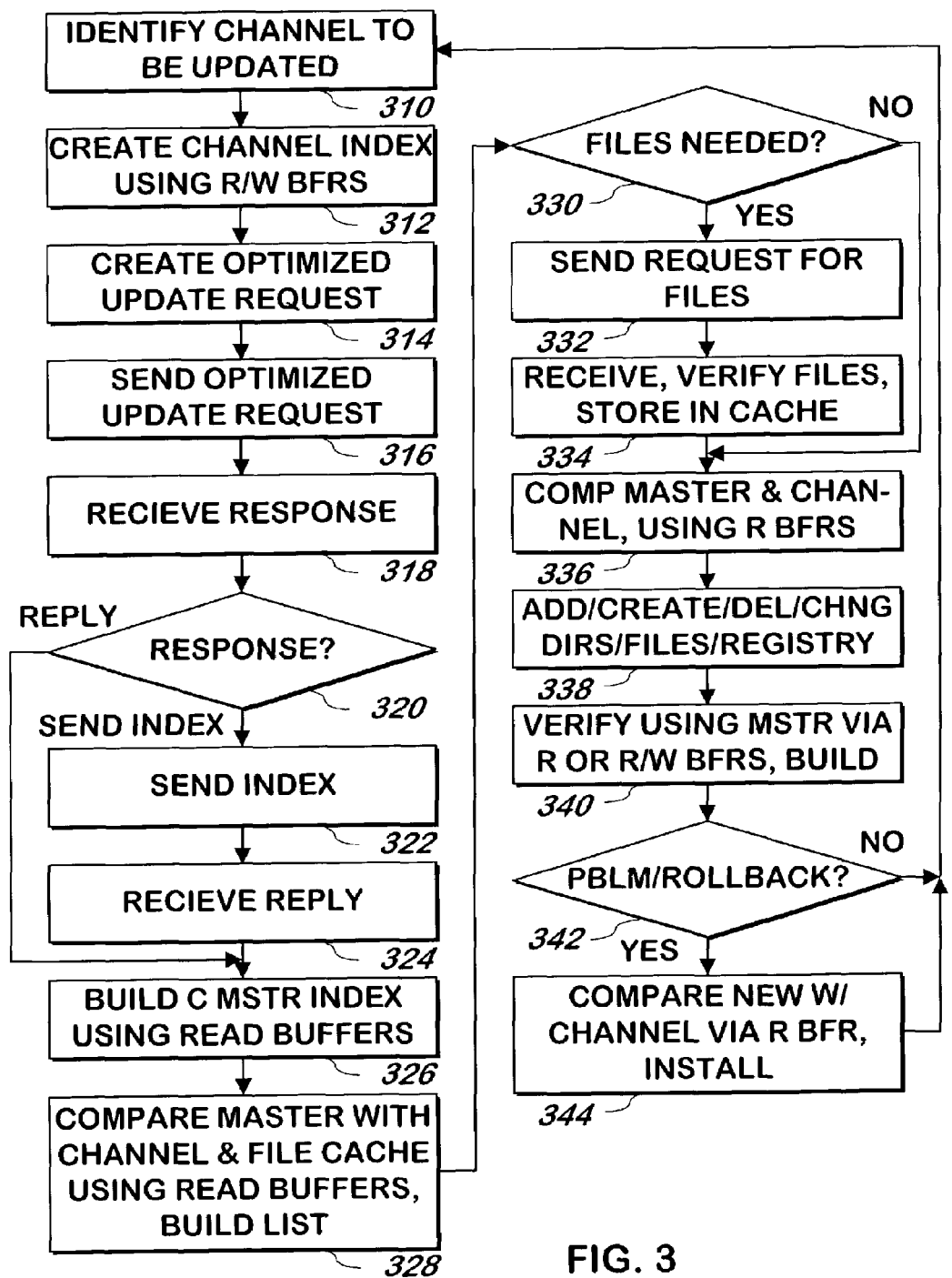
FIG. 3 is a flowchart illustrating a method of updating a device according to one embodiment of the present invention.

Referring now to FIG. 3 a method of updating a device is shown according to one embodiment of the present invention. In one embodiment, each device has an in place execution capability for some, most or all of an operating system and/or one or more application programs. In one embodiment, the device is a device for which a channel index, or a channel index and another index with which the channel index is being compared, will not fit into high speed memory such as RAM (but not including a cache), or will not fit without unacceptably degrading system performance, but for which a secondary storage structure, such as flash memory or disk storage or other non-disk nonvolatile storage, slower than high speed storage, is available to store files.

A channel is identified 310 for updating as described above. A channel index is created 312 using read/write access to nodes as described above and below with reference to FIG. 4. An optimized update request may be created from the channel index using read access to nodes 314 or may be created as the channel index is being created in step 312. The optimized update request is sent 316 to a server, for example, using a communication channel such as an IP address corresponding to the channel. The server builds and sends a response as described above.

The response is received 318 to the optimized update request as described above. If the response indicates that a channel index is required 320, another update request containing the channel index for the channel being updated is sent 322 to the server, the server builds and sends a response as described above, the response is received 324 containing differences between the channel index and a master index and the method continues at step 326. If the response to the optimized update request contains a list of actions to be performed to cause the file and/or registry structure of the channel index to correspond to that described by a master index 320, the method continues at step 326.

At step 326, the list of actions received in step 318 or 324 are applied to the channel index to produce a copy of a master index as described above. The copy of the master index and the channel index are compared and the result may be compared with a set of stored files as described above to identify a list of files required to perform the update, using read access to the nodes of each of the two indices 328. If the list indicates that files are needed 330, a request for the files is sent 332 to the server, which provides them in response to the request, and the files are received and verified and stored, for example, in a file cache 334. The copy of the master index and the channel index are compared 336 using read access to nodes of both indices and any of files, directories or registry settings on the device are added, created, deleted or modified 338 as part of an installation process as described above, according to the differences identified in the comparison of step 336.

The directory structure, files and registry keys are verified against the copy of the master index (using either read access to nodes in the copy of the master index or read and write access to nodes in the copy of the master index) and the copy of the master index is modified (using the read and write access to its nodes) or a new index is built using read and write access to nodes for the new index 340.

If the verification step indicates that the installation process did not properly occur, or upon a user request 342, a comparison is made between the new index and the channel index, using read access to nodes in the two indices, and the any or all of the files, directory structure and registry keys of the device are restored to match the channel index 344 as described above and the method continues at step 310. Otherwise 342, the method continues at step 310.

As described above, read access to the nodes or read and write access to nodes are employed to read, build or modify an index stored in a first type of storage using a buffer in a different type, faster than the first type, of storage.

Referring now to FIG. 4 a method of accessing a node of an index via read and write access is shown according to one embodiment of the present invention. A next node, write or add request is received in step 410 (a delete current node request may be received in step 440 and is described below). The request may include the handle to the index to which the request pertains. If a current node exists in the buffer 412, it is written 414 to secondary storage, which is storage that is slower or less expensive or both, than the storage used to hold the buffer. In one embodiment, the current node is written to the index only if it has been changed, and so step 412 include the test for the current node in the buffer described above and the fact that the current node has been changed.

If the request received in step 410 is a request for the next node in the index 416, if there are additional nodes in the index past any current node 418, the "next" node in the index following the current node (and if there is no current node, the first node in the index) is copied 422 from secondary storage into the buffer and designated as the new current node. The buffer has a limited amount of space: as one node is copied into it, one or more nodes residing in the buffer the longest may be overwritten.

In one embodiment, the "next" node in an index is the node following the current node if the nodes had been sorted in alphabetical order, with ties broken in a consistent manner, such as the node with the offset to the parent node having the smallest value, and if a tie still remains, a directory node is "before" a file node of the same name and having the same parent. Any other way of selecting a "next" node and breaking ties that provides consistent results and a way of verifying the "order" of two nodes from different indices may be used.

If there is a parent node of the node most recently copied into the buffer 424, such parent node is also copied into the buffer 426 and the method repeats at step 424 until all of the ancestor nodes of the current node are copied into the buffer, at which point step 424 takes the "no" branch to step 428.

At step 428, one or more pointers to the current and ancestor nodes in the buffer are provided, and the method continues at step 410 or 440. In one embodiment, step 426 includes linking ancestor nodes to the current node in the form of a linked list starting from the current node and working up through the hierarchy, and so only a single pointer to the current node is provided at step 428. The method continues at step 410 or 440.

At step 416, if the request received in step 410 is a request to add a node, storage is allocated and a pointer to the allocated storage is provided 430 and the method continues at step 410 or 440. In one embodiment the added node is added as a descendent of the current node which is kept in the buffer along with its ancestors and step 430 includes linking the new node to the current node. The method continues at step 410 or 440.

At step 416, if the request received in step 410 is a request to write the current node to secondary storage, the method continues at step 410 or 440 (the write having occurred in steps 412 and 414).

At step 440, a request to delete the current node is received. The current node is deleted from the buffer and from the index 442. Step 442 may include deleting nodes in the index descendant from the current node. The method continues at steps 410 or 440.

Referring now to FIG. 5, a method of accessing a node of an index via read access is shown according to one embodiment of the present invention. A request for a next node is received 510, for example, with a handle to the index. If a current node exists in the buffer 512, and there are more nodes in the index 514, the next node is located (the "next" node being located as described above with reference to FIG. 4), copied into the buffer, and a pointer to the node in the buffer is provided 516, and the method continues at step 510. The buffer contains a limited amount of space, as one node is copied into it, one or more other oldest nodes residing in the buffer may be overwritten.

If there is no current node in the buffer at step 512, the first node in the index is located, 522, and the method continues at step 520, with the "next" node being the first node of the index or the header, in one embodiment. If, at step 514, there are no more nodes in the index, an indication that there are no further nodes in the index is provided 516 and the method continues at step 510.

Figure 6:
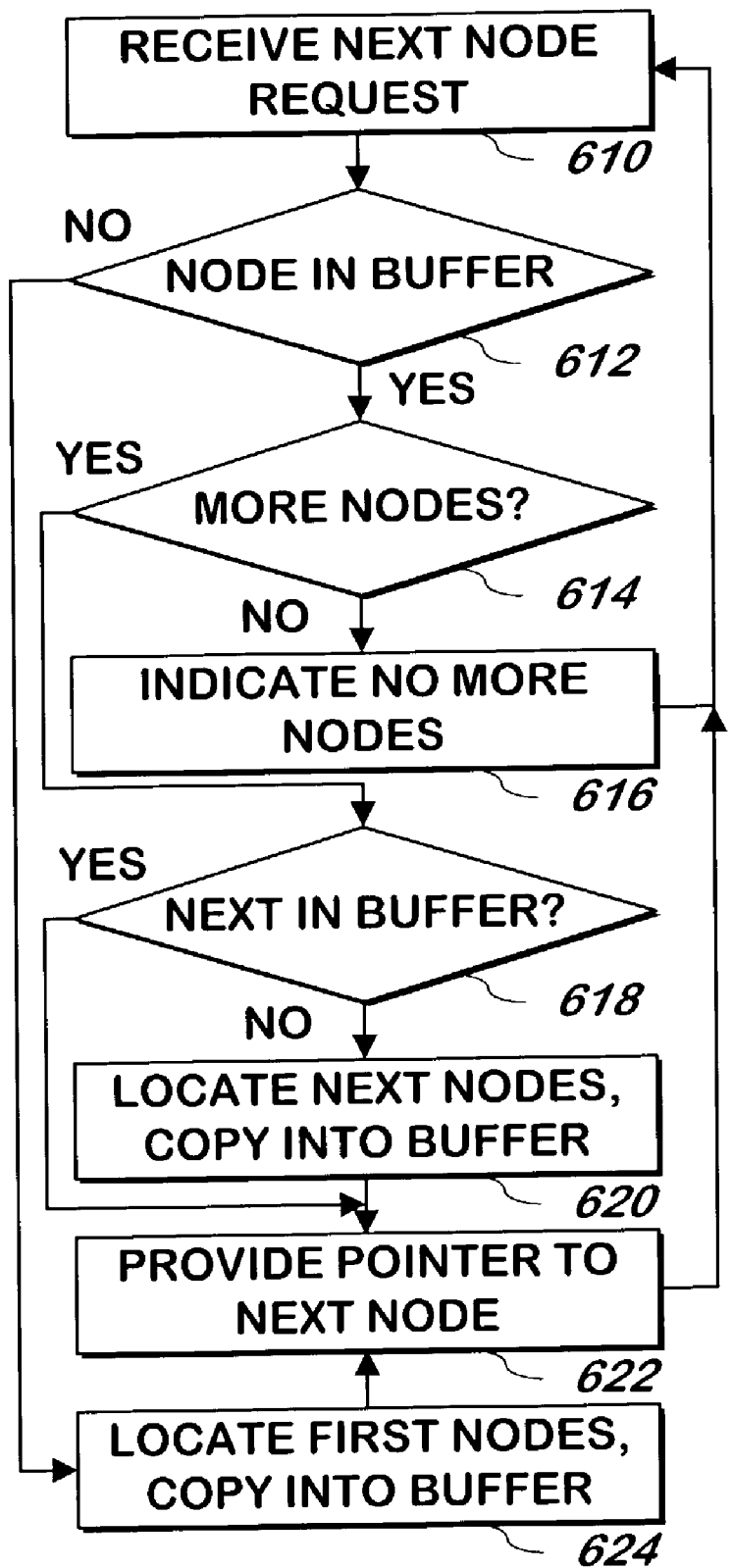
FIG. 6 is a flowchart illustrating a method of accessing a node of an index via read access using a caching arrangement according to one embodiment of the present invention.

Referring now to FIG. 6, a method of accessing a node of an index via read access using a caching arrangement is shown according to one embodiment of the present invention. A request for the next node in an index is received 610, for example, with a handle to the index. If a current node exists in the buffer 612, and there are more nodes in the index 614 if the next node is cached in the buffer 618, a pointer to the next node in the buffer is provided 622 and the method continues at step 610. If there are no more nodes in the index 616, an indication of this state is provided 616 and the method continues at step 610.

If the next node is not cached in the buffer 618, a set of the next nodes are located and copied in order into the buffer 620, overwriting the former nodes in the buffer and a pointer to the next node is provided 622 and the method continues at step 610. If there are no nodes in the buffer at step 612, a set of sequentially ordered nodes including the first node in the index are copied 624 into the buffer and the method continues at step 622, with the pointer provided being the first node of the index (which may be the header of the index in one embodiment).

The method of FIG. 4 may also be adapted to employ a caching arrangement, in which more nodes than the current node and its ancestor nodes are read into the buffer. In such embodiment, if space permits, the next node from the current node and its ancestor nodes are retrieved and stored into the buffer (and this process is repeated for as many next nodes and their ancestor nodes as will fit into the buffer), to the extent that space permits, when a current node and its ancestors are read into the buffer. When the next node is retrieved, a determination is made as to whether the node and its ancestor nodes are already in the buffer. If so, they are not copied into the buffer. If not, they (or the portion of the next node and its ancestor nodes missing from the buffer) are copied into the buffer along with other next nodes and their ancestor nodes to the extent space permits. These modifications are made to steps 422–426 of FIG. 4.

In the case where read and write access is cached, the writing of the current node may be performed before such time as it is removed from the buffer or at such time as it is removed from the buffer if it has been changed. Such modifications may be part of step 414.

Appendix A

An index includes a header, followed by node data for each node. A node can be a subdirectory, a file or a registry key. The header has the following format:
MAGIC (32-bit integer, 0xCAFEBEEF)
VERSION (32-bit integer)
checksum (128-bit checksum, such as MD5, of the entire index)
nodecount (32-bit integer count of the number of nodes that follow)
size (64-bit integer count of the channel index)

For each node, the following is appended to the header:
metadata-length (variable-length integer length of metadata)
metadata (metadata-length bytes of data. The metadata length and metadata need not be provided to the server 274 or included in the checksum when the channel index is provided to it.)
mode-bits (byte specifying the type of node: directory node (for subdirectories), file node, end of directory node (follows the last file in a subdirectory) or end of index (follows the last node in the index), also specifies file attributes, for example, indicating read, write and execute access and whether the file is hidden. If mode bits specify a file node, they also indicate attributes of the file: such as whether it has read, write or execute access and whether the file is hidden)

In addition to the above information, each file node and directory node contains one of the following groups of data, based on the mode bits (the metadata length and metadata fields above are located in the order shown below):

Directory node:
parent-offset (offset in bytes, counting backwards from the start of this node, to parent node, variable-length integer)
name (node-name in UTF8-format)
count (child-count)
excount (number of non-excluded children that contribute to the checksum of the parent node, other children may be excluded from the checksum calculation)
metadata-length (variable-length integer)
metadata (metadata-length bytes of data)

File node:
parent-offset (offset in bytes to parent node, variable length-integer)
name (node-name in UTF8-format)
checksum (128-bit checksum)
size (file-size in bytes, variable-length integer)
metadata-length (variable-length integer)
metadata (metadata-length bytes of data)

What is claimed is:

1. A method of processing a first description of a file or registry system of a device, the first description comprising a plurality of elements, the method comprising:
creating at least one first element of the first description in a first storage;
storing the at least one first element in a second storage, the second storage being nonvolatile and having a second speed slower than a first speed of the first storage;
creating at least one second element of the first description in the first storage; and
storing the at least one second element in the second storage,
wherein at the completion of creating the at least one second element in the first storage, at least a portion of the at least one first element no longer resides in the first storage.

2. The method of claim 1, further comprising:
reading at least a first substantial portion of the first description from the second storage by reading one of a plurality of portions of the first description at a time; and
storing the first substantial portion of the first description in the first storage by using a space in the first storage smaller than the first substantial portion of the first description.

3. The method of claim 2, wherein the plurality of elements of the first description have an order, and wherein the act of reading the first substantial portion of the first description is performed according to that order.

4. The method of claim 2, further comprising:
reading at least a second substantial portion of a second description from the second storage by reading one of a plurality of portions of the second description at a time; and
storing the second substantial portion of the second description in the first storage by using a space in the first storage smaller than the second substantial portion of the second description, wherein the second description comprises a plurality of elements having an order, and wherein the act of reading the second substantial portion of the second description is performed according to that order.

5. The method of claim 4, further comprising comparing at least one of the plurality of elements of the first description with at least one of the plurality of elements of the second description.

6. The method of claim 5, wherein the act of comparing includes comparing the elements of the second description with a set of files; and wherein the method further comprises:

requesting a group of files responsive to the act of comparing;

receiving the files requested; and storing the files received.

7. The method of claim 5, wherein the act of comparing includes comparing the elements of the second description with a set of files; and wherein the method further comprises:

requesting a group of files responsive to the act of comparing and to a set of rules;

receiving the files requested; and storing the files received.

* * * * *